(12) United States Patent
Zhou et al.

(10) Patent No.: US 10,624,033 B2
(45) Date of Patent: Apr. 14, 2020

(54) VOICE OVER INTERNET PROTOCOL POWER CONSERVATION TECHNIQUES FOR WIRELESS SYSTEMS

(71) Applicant: QUALCOMM Incorporated, San Diego, CA (US)

(72) Inventors: Ping Zhou, San Diego, CA (US); Sudhir Krishnan, San Diego, CA (US); Prashanth Gurram, San Diego, CA (US); Kunal Atitkar, San Diego, CA (US); Franck Dahan, San Diego, CA (US); Xin Kang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 124 days.

(21) Appl. No.: 15/722,947

(22) Filed: Oct. 2, 2017

(65) Prior Publication Data

US 2019/0021054 A1 Jan. 17, 2019

Related U.S. Application Data

(60) Provisional application No. 62/533,559, filed on Jul. 17, 2017.

(51) Int. Cl.
  *H04W 52/02* (2009.01)
  *G10L 19/12* (2013.01)
  *G10L 19/16* (2013.01)

(52) U.S. Cl.
  CPC ......... *H04W 52/0254* (2013.01); *G10L 19/12* (2013.01); *G10L 19/16* (2013.01);
  (Continued)

(58) Field of Classification Search
  CPC ......... H04W 52/0254; H04W 52/0219; H04W 52/0222; H04W 52/028; H04W 52/0216;
  (Continued)

(56) References Cited

U.S. PATENT DOCUMENTS

2013/0003629 A1* 1/2013 Jeong ............... H04W 52/0216
                                                                370/311
2013/0039238 A1   2/2013 Santos Barreto et al.
(Continued)

FOREIGN PATENT DOCUMENTS

EP           2959744 A1    12/2015
IN    CHE-2013-04143 A     3/2015
(Continued)

OTHER PUBLICATIONS

International Search Report and Written Opinion—PCT/US2018/042325—ISA/EPO—dated Oct. 8, 2018.

*Primary Examiner* — Ian N Moore
*Assistant Examiner* — Justin T Van Roie
(74) *Attorney, Agent, or Firm* — Holland & Hart LLP

(57) ABSTRACT

Methods, systems, and devices for wireless communication are described. A user equipment (UE) may be enabled for voice over long term evolution (VoLTE). The UE may include an audio layer to encode and decode voice information and a packet layer to transmit voice packets. The packet layer may store parameters related to a discontinuous reception (DRX) in a shared memory. The audio layer may obtain the DRX parameters and encode voice information based on the parameters. For example, the audio layer coding may be synchronized with the wake period of the DRX cycle. The audio layer may encode voice information during a wake up period of the packet layer DRX cycle, and the packet layer may transmit the voice packets while awake. The audio layer may perform back to back encodings at the beginning of the DRX cycle. The packet layer may extend the wake period to transmit the voice packets.

26 Claims, 12 Drawing Sheets

(52) U.S. Cl.
CPC ..... *H04W 52/028* (2013.01); *H04W 52/0216* (2013.01); *H04W 52/0219* (2013.01); *H04W 52/0222* (2013.01)

(58) Field of Classification Search
CPC .... H04W 52/0225; G10L 19/16; G10L 19/12; G10L 19/167
See application file for complete search history.

(56) References Cited

U.S. PATENT DOCUMENTS

| | | |
|---|---|---|
| 2013/0044660 A1 | 2/2013 | Edara et al. |
| 2013/0045770 A1* | 2/2013 | Aschan ............. H04W 52/0216 455/522 |
| 2015/0092563 A1 | 4/2015 | Tabet et al. |
| 2015/0092644 A1 | 4/2015 | Verger et al. |
| 2017/0070909 A1 | 3/2017 | Kim et al. |
| 2017/0181219 A1 | 6/2017 | Cesares et al. |

FOREIGN PATENT DOCUMENTS

| | | |
|---|---|---|
| WO | WO-2009124806 A1 | 10/2009 |
| WO | WO-2014129948 A1 | 8/2014 |

* cited by examiner

VOICE OVER INTERNET PROTOCOL POWER CONSERVATION TECHNIQUES FOR WIRELESS SYSTEMS

CROSS REFERENCES

The present Application for Patent claims priority to U.S. Provisional Patent Application No. 62/533,559 by ZHOU, et al., entitled "Voice Over Internet Protocol Power Conservation Techniques For Wireless Systems," filed Jul. 17, 2017, assigned to the assignee hereof.

BACKGROUND

The following relates generally to wireless communication, and more specifically to voice over internet protocol power conservation techniques for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A mobile device (e.g., a UE) configured for voice over internet protocol may include an audio layer and a packet layer which operate asynchronously in time. To conserve power, the mobile device may operate the packet layer according to a discontinuous reception (DRX) cycle that includes a DRX wake period and a DRX sleep period. The mobile device may sleep during the DRX sleep period and wake up during the DRX wake period to perform communications. In some cases, when utilizing voice over internet protocol, the audio layer may encode voice information while the packet layer is in the sleep period of the DRX cycle, which may trigger the packet layer to wake and transmit the encoded voice information as packets. Waking up the packet layer from a low power mode or preventing the packet layer from entering low power mode may reduce time spent in the low power mode, which may result in excess power usage and inefficiencies.

SUMMARY

A UE may be enabled for voice over LTE (VoLTE) or other voice over packet switched technology, which enables the UE to transmit voice information over in packets (e.g., over LTE channels). The UE may include an audio layer and a packet layer, or modem layer. The audio layer may encode and decode voice information, and the packet layer may transmit the encoded voice information as packets over LTE. The packet layer may store parameters related to a DRX cycle in a shared memory.

The audio layer may retrieve the DRX cycle parameters and establish a coding timeline based on the DRX cycle parameters. For example, the audio layer coding may be synchronized with the wake period of the DRX cycle based on the DRX parameters. In some examples, the audio layer may perform multiple voice encodings back to back at the beginning of the DRX cycle. For example, the audio layer may encode a first set of voice information, then encode a second set of voice information directly after the encoding the first set. The audio layer may encode the sets of voice information when the packet layer is awake at the beginning of the DRX cycle and send the encoded voice information to the packet layer. The packet layer may transmit the voice packets and enter a low power mode or sleep period for the remainder of the DRX cycle. In some examples, encoding and decoding voice information may last longer than the normal wake period of the DRX cycle. The packet layer may extend the wake period to transmit the voice packets. The packet layer may enter the low power mode after the extended wake period.

A method of wireless communication is described. The method may include identifying, by an audio layer of a wireless device, a set of samples of a voice transmission, obtaining, from a memory accessible by the audio layer and a packet layer of the wireless device, a set of DRX parameters corresponding to the packet layer of the wireless device, synchronizing an audio timeline of the audio layer with a DRX cycle of the packet layer based at least in part on the set of DRX parameters, and encoding, by the audio layer, the set of samples of the voice transmission based at least in part on the synchronized audio timeline.

An apparatus for wireless communication is described. The apparatus may include means for identifying, by an audio layer of a wireless device, a set of samples of a voice transmission, means for obtaining, from a memory accessible by the audio layer and a packet layer of the wireless device, a set of DRX parameters corresponding to the packet layer of the wireless device, means for synchronizing an audio timeline of the audio layer with a DRX cycle of the packet layer based at least in part on the set of DRX parameters, and means for encoding, by the audio layer, the set of samples of the voice transmission based at least in part on the synchronized audio timeline.

Another apparatus for wireless communication is described. The apparatus may include a processor, memory in electronic communication with the processor, and instructions stored in the memory. The instructions may be operable to cause the processor to identify, by an audio layer of a wireless device, a set of samples of a voice transmission, obtain, from a memory accessible by the audio layer and a packet layer of the wireless device, a set of DRX parameters corresponding to the packet layer of the wireless device, synchronize an audio timeline of the audio layer with a DRX cycle of the packet layer based at least in part on the set of DRX parameters, and encode, by the audio layer, the set of samples of the voice transmission based at least in part on the synchronized audio timeline.

A non-transitory computer readable medium for wireless communication is described. The non-transitory computer-readable medium may include instructions operable to cause a processor to identify, by an audio layer of a wireless device, a set of samples of a voice transmission, obtain, from a memory accessible by the audio layer and a packet layer of the wireless device, a set of DRX parameters corresponding to the packet layer of the wireless device, synchronize an audio timeline of the audio layer with a DRX cycle of the packet layer based at least in part on the set of DRX parameters, and encode, by the audio layer, the set of samples of the voice transmission based at least in part on the synchronized audio timeline.

Some examples of the method, apparatus, and non-transitory computer-readable medium described above may further include processes, features, means, or instructions for determining, by the audio layer, a DRX wake period of the packet layer based at least in part on the set of DRX parameters, wherein encoding the set of samples may be performed during at least a portion of the DRX wake period.

Some examples of the method, apparatus, and non-transitory computer-readable medium described above may further include processes, features, means, or instructions for sending the encoded set of samples to the packet layer of the wireless device.

Some examples of the method, apparatus, and non-transitory computer-readable medium described above may further include processes, features, means, or instructions for transmitting, to a second wireless device, a packet that corresponds to at least a portion of the encoded set of samples.

Some examples of the method, apparatus, and non-transitory computer-readable medium described above may further include processes, features, means, or instructions for establishing a coding timeline for encoding the voice transmission based at least in part on the set of DRX parameters. Some examples of the method, apparatus, and non-transitory computer-readable medium described above may further include processes, features, means, or instructions for encoding the set of samples according to the established coding timeline.

In some examples of the method, apparatus, and non-transitory computer-readable medium described above, an encoding operation of the coding timeline may be aligned with a beginning of a DRX wake period of the set of DRX parameters.

Some examples of the method, apparatus, and non-transitory computer-readable medium described above may further include processes, features, means, or instructions for encoding the set of samples according to the synchronized audio timeline.

In some examples of the method, apparatus, and non-transitory computer-readable medium described above, encoding the set of samples comprises: encoding a first subset of samples. Some examples of the method, apparatus, and non-transitory computer-readable medium described above may further include processes, features, means, or instructions for encoding a second subset of samples subsequent to the encoding of the first subset of samples.

Some examples of the method, apparatus, and non-transitory computer-readable medium described above may further include processes, features, means, or instructions for extending a DRX wake period of the packet layer based at least in part on a time interval for encoding of the first and second subsets of samples.

In some examples of the method, apparatus, and non-transitory computer-readable medium described above, the first and second subsets of samples may be encoded within a DRX wake period of the packet layer.

In some examples of the method, apparatus, and non-transitory computer-readable medium described above, the first and second subsets of samples may be encoded back-to-back.

Some examples of the method, apparatus, and non-transitory computer-readable medium described above may further include processes, features, means, or instructions for storing, by the packet layer, the set of DRX parameters on the memory.

In some examples of the method, apparatus, and non-transitory computer-readable medium described above, the memory comprises storage shared between the audio layer and the packet layer.

A method of wireless communication is described. The method may include receiving, at a wireless device, a packet corresponding to a voice over internet protocol transmission, obtaining, from a memory accessible by an audio layer and a packet layer of the wireless device, a set of DRX parameters corresponding to the packet layer of the wireless device, synchronizing an audio timeline of the audio layer with a DRX cycle of the packet layer based at least in part on the set of DRX parameters, and decoding, by the audio layer, at least a portion of the packet based at least in part on the synchronized audio timeline.

An apparatus for wireless communication is described. The apparatus may include means for receiving, at a wireless device, a packet corresponding to a voice over internet protocol transmission, means for obtaining, from a memory accessible by an audio layer and a packet layer of the wireless device, a set of DRX parameters corresponding to the packet layer of the wireless device, means for synchronizing an audio timeline of the audio layer with a DRX cycle of the packet layer based at least in part on the set of DRX parameters, and means for decoding, by the audio layer, at least a portion of the packet based at least in part on the synchronized audio timeline.

Another apparatus for wireless communication is described. The apparatus may include a processor, memory in electronic communication with the processor, and instructions stored in the memory. The instructions may be operable to cause the processor to receive, at a wireless device, a packet corresponding to a voice over internet protocol transmission, obtain, from a memory accessible by an audio layer and a packet layer of the wireless device, a set of DRX parameters corresponding to the packet layer of the wireless device, synchronize an audio timeline of the audio layer with a DRX cycle of the packet layer based at least in part on the set of DRX parameters, and decode, by the audio layer, at least a portion of the packet based at least in part on the synchronized audio timeline.

A non-transitory computer readable medium for wireless communication is described. The non-transitory computer-readable medium may include instructions operable to cause a processor to receive, at a wireless device, a packet corresponding to a voice over internet protocol transmission, obtain, from a memory accessible by an audio layer and a packet layer of the wireless device, a set of DRX parameters corresponding to the packet layer of the wireless device, synchronize an audio timeline of the audio layer with a DRX cycle of the packet layer based at least in part on the set of DRX parameters, and decode, by the audio layer, at least a portion of the packet based at least in part on the synchronized audio timeline.

Some examples of the method, apparatus, and non-transitory computer-readable medium described above may further include processes, features, means, or instructions for determining, by the audio layer, a DRX wake period of the packet layer based at least in part on the set of DRX parameters, wherein decoding at least the portion of the packet may be performed during at least a portion of the DRX wake period.

Some examples of the method, apparatus, and non-transitory computer-readable medium described above may further include processes, features, means, or instructions for establishing a coding timeline for decoding the packet based at least in part on the set of DRX parameters. Some examples of the method, apparatus, and non-transitory computer-readable medium described above may further include processes, features, means, or instructions for decoding at least the portion of the packet according to the established coding timeline.

In some examples of the method, apparatus, and non-transitory computer-readable medium described above, a decoding operation of the coding timeline may be aligned with a beginning of a DRX wake period of the set of DRX parameters.

Some examples of the method, apparatus, and non-transitory computer-readable medium described above may further include processes, features, means, or instructions for decoding at least the portion of the packet according to the synchronized audio timeline.

In some examples of the method, apparatus, and non-transitory computer-readable medium described above, decoding at least the portion of the packet comprises: decoding a first portion of the packet. Some examples of the method, apparatus, and non-transitory computer-readable medium described above may further include processes, features, means, or instructions for decoding a second portion of the packet subsequent to the decoding of the first portion of the packet.

Some examples of the method, apparatus, and non-transitory computer-readable medium described above may further include processes, features, means, or instructions for extending a DRX wake period of the packet layer based at least in part on a time interval for decoding the first and second portions of the packet.

In some examples of the method, apparatus, and non-transitory computer-readable medium described above, the first and second portions of the packet may be decoded within a DRX wake period of the packet layer.

In some examples of the method, apparatus, and non-transitory computer-readable medium described above, the first and second portions of the packet may be decoded back-to-back.

Some examples of the method, apparatus, and non-transitory computer-readable medium described above may further include processes, features, means, or instructions for storing, by the packet layer, the set of DRX parameters on the memory.

In some examples of the method, apparatus, and non-transitory computer-readable medium described above, the memory comprises storage shared between the audio layer and the packet layer.

DETAILED DESCRIPTION

Figure 1:
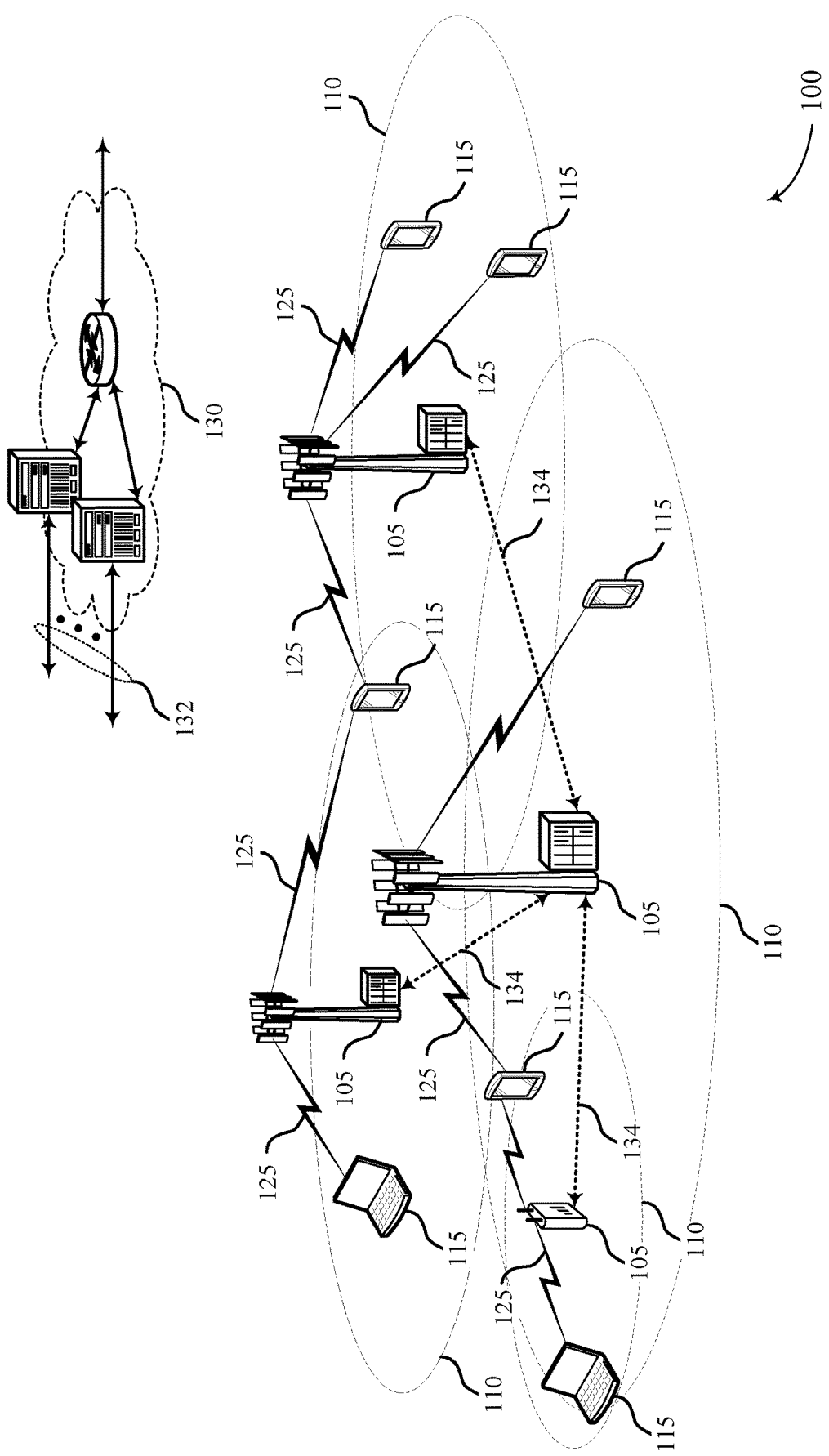
FIG. 1 illustrates an example of a system for wireless communication that supports voice over internet protocol power conservation techniques for wireless systems in accordance with aspects of the present disclosure.

A UE may be enabled for VoLTE or another packet-based operation, which enables the UE to transmit voice information in packets (e.g., over LTE channels). The UE may include an audio layer and a packet layer. The audio layer may encode and decode voice information, and the UE may transmit the encoded voice information as packets over LTE using the packet layer. The audio layer may encode voice information into packets for transmission by the packet layer during an audio layer compression/decompression (codec) period. When voice information is ready for transmission, the audio layer may send the voice packets to the packet layer for the packet layer to transmit. The packet layer may be configured based on DRX cycles, where the UE periodically wakes up to check for pending data transmissions then returns to sleep after handling any pending data transmission until the next DRX cycle. The audio layer and the packet layer of the UE may operate asynchronously. For example, if the UE is engaged in voice communication, the UE may continuously receive incoming and outgoing voice information from the user and from the other device engaged in the voice call, even if the packet layer is asleep. In some examples, the audio layer codec may occur while the packet layer is in the sleep period of the DRX cycle. The packet layer may wake to transmit the voice packets. Waking up the packet layer from a low power mode or preventing the packet layer from entering low power mode may reduce time spent in the low power mode, which leads to excess power usage and inefficiencies.

The packet layer and audio layer may coordinate audio layer encoding with the wake period of the DRX cycle. The packet layer may store parameters related to the DRX cycle in a shared memory. The audio layer may obtain the DRX cycle parameters and synchronize the audio layer codec period with the DRX cycle. In some examples, the audio layer may store voice information or audio layer information in the shared memory for the packet layer to retrieve and use.

The audio layer may perform voice encoding and decoding at the beginning of the DRX cycle based on the DRX cycle parameters. Thus, the audio layer may finish voice encoding and send the encoded voice information to the packet layer while the packet layer is awake. The packet layer may transmit the voice packets during the wake period and go to a low power mode or sleep cycle without being woken up by additional encoded voice information later in the DRX cycle.

In some examples, the audio layer may perform voice encodings back to back based on the DRX parameters. The audio layer may encode a set of voice samples during a DRX wake up period. The audio layer may encode a first subset of voice information, then encode a second subset of voice information directly after the encoding the first subset. The audio layer may encode the sets of voice information when the packet layer is awake, and the packet layer may transmit the voice packets and enter a low power mode or sleep period for the remainder of the DRX cycle.

In some examples, the encoding and decoding of the voice information may last longer than the normal wake period of the DRX cycle. The packet layer may extend the wake period to transmit the voice packets. The packet layer may enter the low power mode after the extended wake period. In some examples, even with an extended wake period, the UE may use less power by entering the low power mode for the remainder of the DRX cycle without being woken to transmit additional voice packets.

Aspects of the disclosure are initially described in the context of a wireless communications system. Aspects of the disclosure are further illustrated by and described with reference to apparatus diagrams, system diagrams, and flowcharts that relate to voice over internet protocol power conservation techniques for wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. In some examples, a wireless device such as a UE 115 or base station 105 may support VoLTE communications via an audio layer and a packet layer of the wireless device. To save power, the packet layer may operate according to a DRX cycle having a wake period and a sleep period. When performing a VoLTE communication, the audio layer may align an encoding or decoding operation with the wake period to avoid waking the packet layer during the sleep period.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
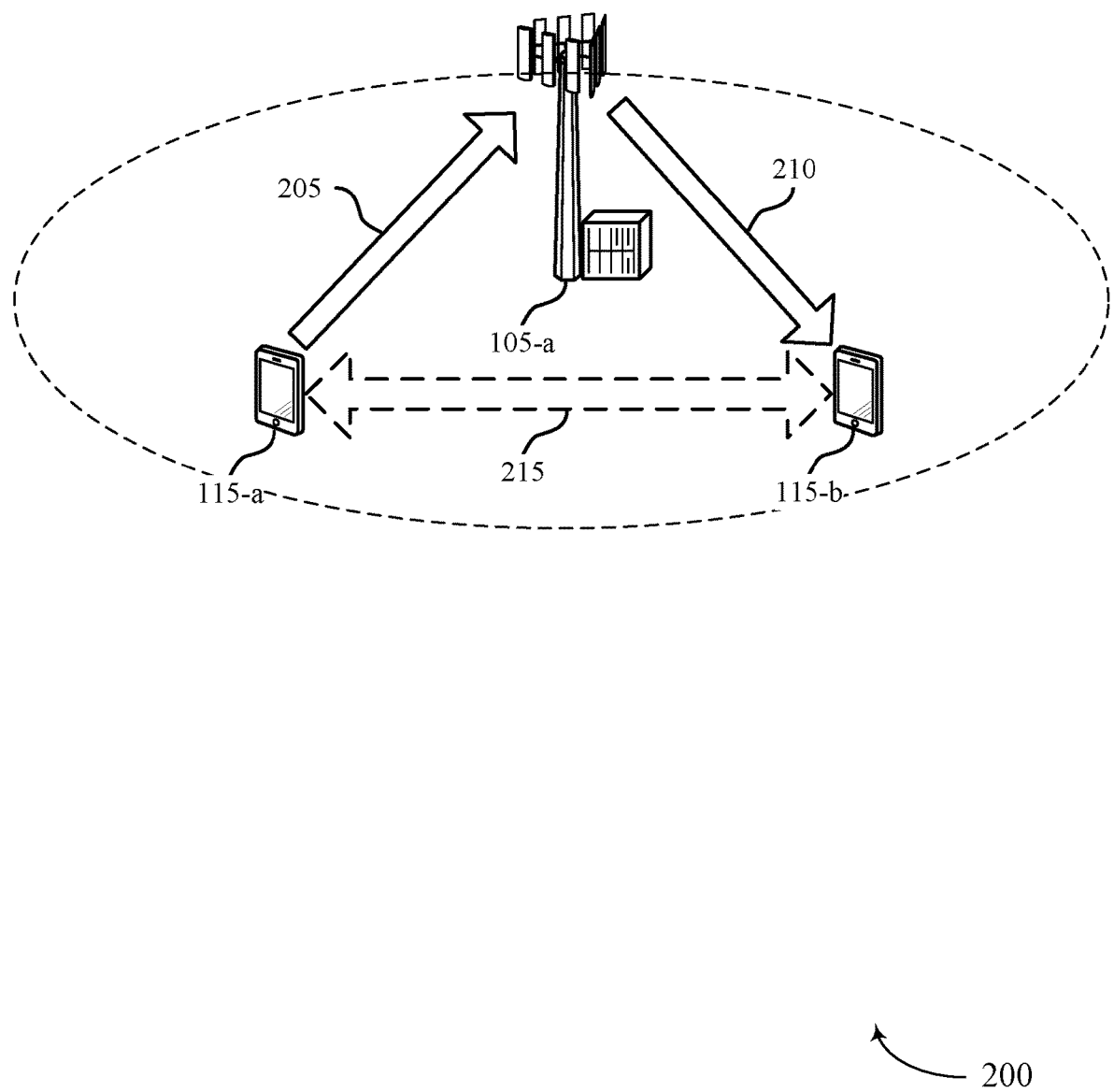
FIG. 2 illustrates an example of a wireless communications system that supports voice over internet protocol power conservation techniques for wireless systems in accordance with aspects of the present disclosure.

FIG. 2 illustrates an example of a wireless communications system 200 that supports voice over internet protocol power conservation techniques for wireless systems in accordance with various aspects of the present disclosure. In some examples, wireless communications system 200 may implement aspects of wireless communications system 100.

Wireless communications system 200 may include base station 105-a, which may be an example of a base station 105 as described herein. Wireless communications system 200 may include UE 115-a and UE 115-b, which may examples of a UE 115 as described herein. UE 115-a and UE 115-b may be engaged in VoLTE communications. In some examples, UE 115-a may transmit uplink information 205 to base station 105-a, and base station 105-a may transmit downlink information 210 to UE 115-b. The uplink information 205 and downlink information 210 may include voice packets for the VoLTE communications. In some examples, UE 115-a and UE 115-b may communicate directly using communication link 215, such as based on D2D communications.

The UEs 115 may each include an audio layer and a packet layer. An audio layer may encode and decode voice information, and the packet layer may transmit the encoded voice information as packets over LTE. The packet layer and audio layer may synchronize audio layer encoding with the wake period of the DRX cycle. The packet layer may store parameters related to the DRX cycle in a shared memory. The audio layer may retrieve the DRX cycle parameters and synchronize the audio layer codec period with the DRX cycle. That is, a UE 115 may establish a coding timeline for the audio layer based on the DRX cycle parameters. In some examples, the audio layer may store voice information or audio layer information in the shared memory for the packet layer to retrieve and use.

For example, the audio layer of UE 115-a may perform voice encoding at the beginning of the DRX cycle based on the DRX cycle parameters. The voice encoding may occur while the packet layer is awake, such that the packet layer may not wake up during the low power period of the DRX cycle to transmit or receive voice packets. During the wake period, the packet layer of UE 115-a may transmit voice packets (e.g., by the uplink information 205 or communication link 215). The packet layer of UE 115-a may then go to a low power mode or sleep cycle without being woken up by additional encoded voice information later in the DRX cycle.

UE 115-b may also establish a coding timeline based on DRX parameters. For example, UE 115-b may receive the voice packets in the downlink information 210 or by the communication link 215. The packet layer of UE 115-b may then decode the voice packets during the wake period of the DRX cycle. After decoding the voice packets, the packet layer of UE 115-b may enter a sleep period of the DRX cycle without being woken to transmit or receive additional voice packets.

In some examples, an audio layer may perform multiple voice encodings back to back at the beginning of the DRX cycle. The audio layer may encode a set of voice samples at the beginning of the DRX cycle. The audio layer may encode a first subset of voice information, then encode a second subset of voice information directly after the encoding the first subset. By performing the encodings back to back, the audio layer may encode the same amount of voice information in less time than the duration of two audio layer codec periods. The audio layer may encode the sets of voice information when the packet layer is awake, and the packet layer may transmit the voice packets and enter a low power mode or sleep period for the remainder of the DRX cycle.

In some examples, an encoding and decoding of voice information may last longer than a normal wake period of a DRX cycle. The packet layer may extend the wake period to transmit the voice packets. The packet layer may enter the low power mode after the extended wake period. In some examples, even with an extended wake period, a UE 115 may use less power by entering the low power mode for the remainder of the DRX cycle without being woken to transmit additional voice packets.

Figure 3:
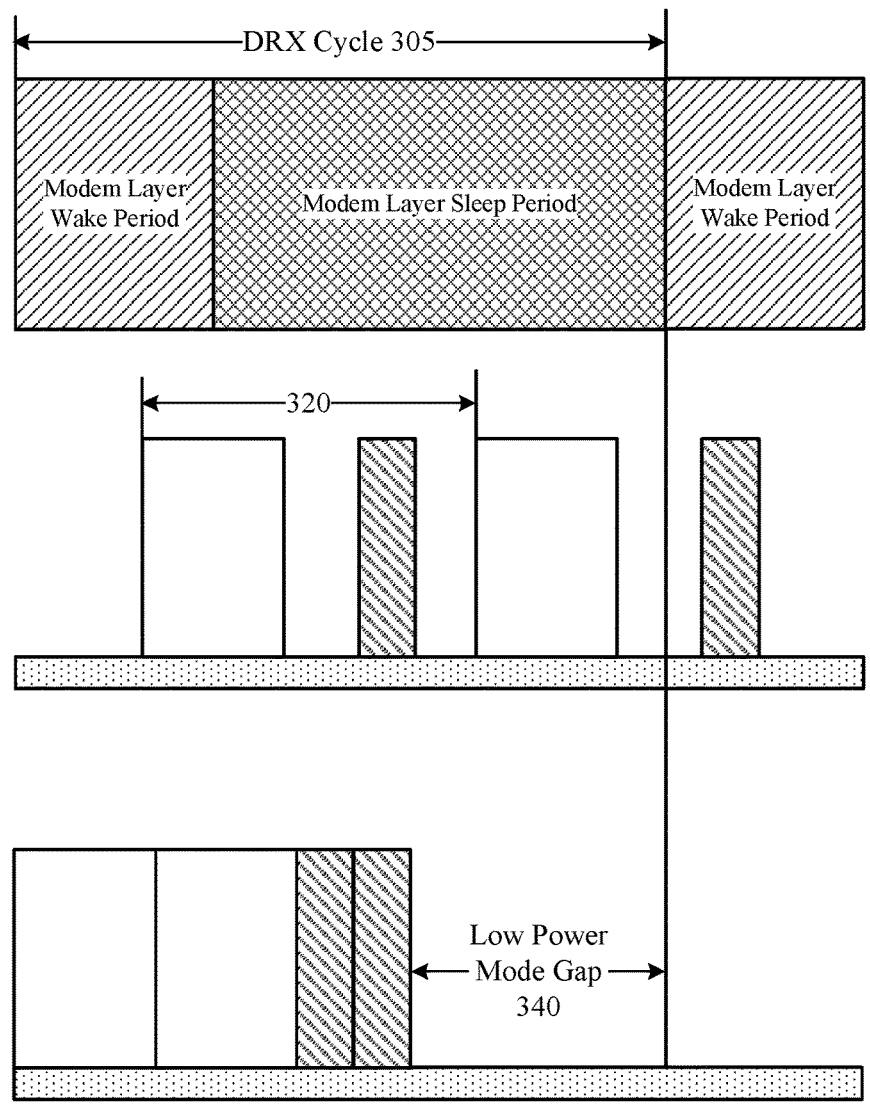
FIG. 3 illustrates an example of a timeline synchronization that supports voice over internet protocol power conservation techniques for wireless systems in accordance with aspects of the present disclosure.

FIG. 3 illustrates an example of a timeline synchronization 300 that supports voice over internet protocol power conservation techniques for wireless systems in accordance with various aspects of the present disclosure. In some examples, timeline synchronization 300 may implement aspects of wireless communications system 100. The timeline synchronization 300 may illustrate examples of a packet layer timeline, an asynchronous audio layer timeline, and a synchronized audio layer timeline.

The packet layer timeline may include DRX cycles 305. A DRX cycle 305 may include a wake period 310 and a sleep period 315. At the beginning of each DRX cycle 305, the packet layer may wake up for the wake period 310. During the wake period 310, the packet layer may determine whether there are any pending data packets and perform data packet exchanges. After the wake period 310, the packet layer may enter the sleep period 315. The packet layer may enter a low power mode during the sleep period 315. In some configurations, such as with asynchronous audio layer timeline, the packet layer may wake up during the sleep period 315 to transmit voice packets.

In the asynchronous audio layer timeline, the audio layer may encode and decode voice information during an audio layer codec period 320. In some examples, the audio layer codec period 320 may have a periodicity of 20 ms. The audio layer codec period 320 may include a voice encoding 325 and a voice decoding 330. The audio layer may consistently receive voice information from an audio front end (AFE) 335. The audio layer may perform a voice encoding 325 and send the encoded voice information to the packet layer for the packet layer to transmit. In some examples, the audio layer may send encoded voice information to the packet layer during the sleep period 315. The packet layer may wake up from the sleep period 315 to transmit the encoded voice information.

The synchronized audio layer timeline has been established based on DRX parameters. For example, the packet layer may store parameters related to the DRX cycle 305 in a shared memory, and the audio layer may obtain the parameters. The audio layer may then establish the audio layer timeline based on the DRX parameters.

In the synchronized audio layer timeline, a voice encoding 325 may begin at the start of the DRX cycle 305, specifically during the wake period 310. The audio layer may send the packet layer the encoded voice information, and the packet layer may transmit the encoded voice information as voice packets during the wake period 310. The audio layer may encode voice information at the start of the next DRX cycle 305. The audio layer may not wake the packet layer up after the wake period 310 (e.g., during the sleep period 315). Thus, synchronizing the audio layer with the packet layer may provide a low power mode gap duration 340, during which the packet layer can enter the sleep period 315 without being woken by the synchronized audio layer to transmit additional voice packets.

In some examples, the audio layer in the synchronized audio layer timeline may perform voice encodings 325 back to back. For example, the audio layer may encode two sets of voice information in a row, sending the two sets of encoded voice information to the packet layer during the wake period 310. The packet layer may then prepare the encoded voice information for transmission and transmit voice packets.

In some examples, performing voice encodings 325 back to back may increase an amount of time that the packet layer is undisturbed in the sleep period 315. However, the amount of voice information that is transmitted may, in some cases, stay the same. For example, the audio layer codec period 320 may have a duration of 20 ms and the DRX cycle 305 may have a duration of 40 ms. While the asynchronous audio layer timeline may be able to perform two voice encodings 325 during one DRX cycle 305, the voice encodings 325 may be spread out across the entire DRX cycle 305. Thus, the audio layer may send voice packets to the packet layer while the packet layer is sleeping, causing the packet layer to wake up and transmit the packets. Instead, synchronized audio layer timeline shows the audio layer performing the same number of voice encodings 325, but while the packet layer is awake. Thus, the synchronized audio layer may still perform two voice encodings 325, but the packet layer may not wake up during the sleep period 315.

In some examples, the voice encoding 325 and voice decoding 330 may have a larger combined duration than the wake period 310. The packet layer may extend the wake period 310 until the audio layer has finished the voice encoding 325 voice decoding 330. Then, the packet layer may enter the sleep period 315.

Figure 4:
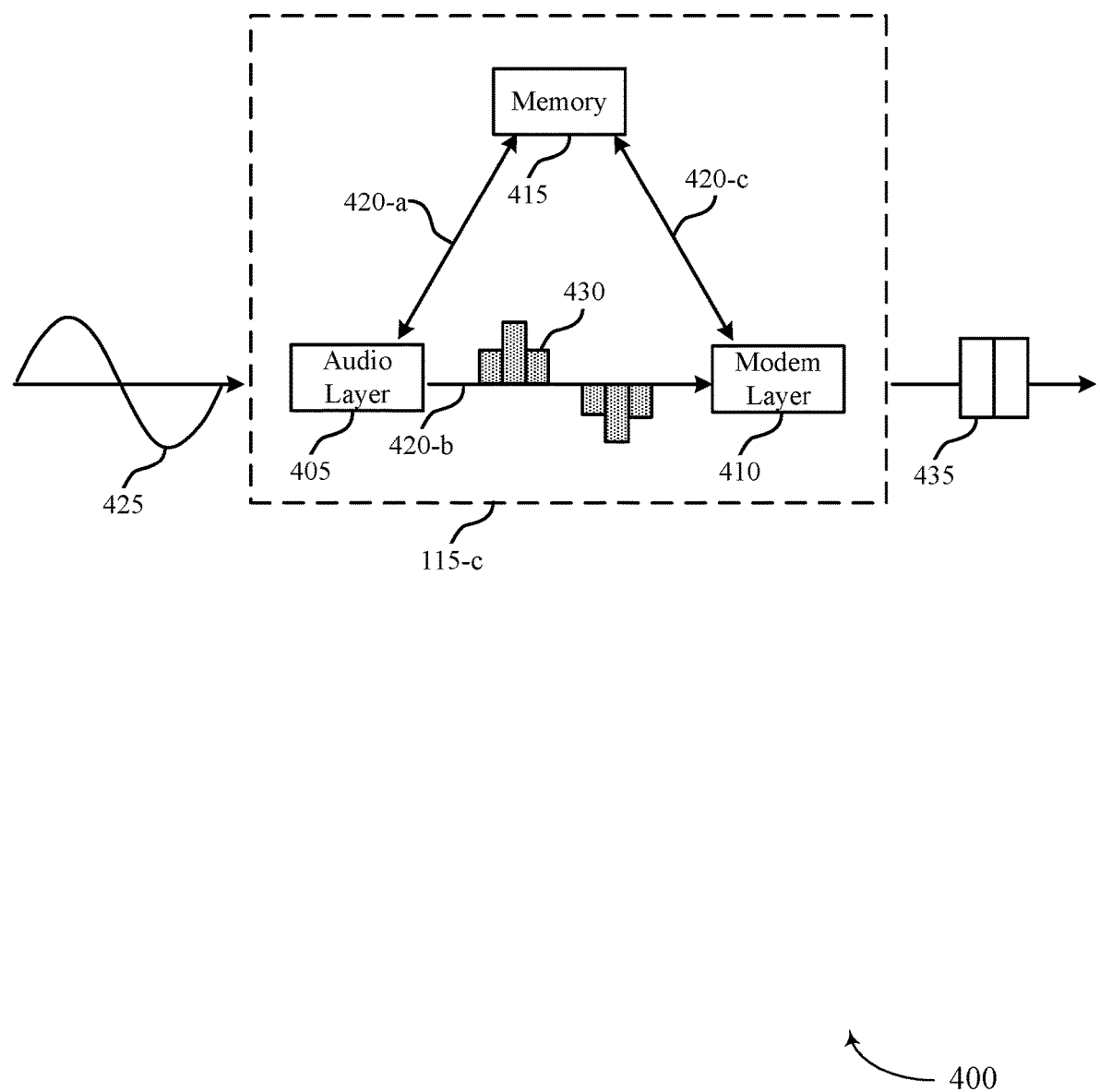
FIG. 4 illustrates an example of a voice packetizing procedure that supports voice over internet protocol power conservation techniques for wireless systems in accordance with aspects of the present disclosure.

FIG. 4 illustrates an example of a voice packetizing procedure 400 that supports voice over internet protocol power conservation techniques for wireless systems in accordance with various aspects of the present disclosure. In some examples, voice packetizing procedure 400 may implement aspects of wireless communication system 100. The voice packetizing process may be performed by UE 115-c, which may be an example of a UE 115 as described herein. UE 115-c may include an audio layer 405, a packet layer 410, and a shared memory 415.

The packet layer 410 may store information or parameters related to a DRX cycle in the shared memory 415 using link 420-a. The audio layer 405 may retrieve the DRX parameters from the shared memory 415 using link 420-b. The audio layer 405 may determine the timing of the DRX wake period based on the DRX parameters. The audio layer 405 may establish a coding timeline for encoding voice transmission based on the DRX parameters. In another implementation, the audio layer 405 may synchronize an audio timeline with the DRX cycle of the packet layer 410 based on the DRX parameters.

The UE 115-c may be engaged in voice communications and receive voice information 425, for example by an AFE. During the wake period of the DRX cycle, the audio layer 405 may encode the incoming voice information into encoded voice information 430. In some examples the audio layer 405 may encode back to back sets of voice information during the wake period of the DRX cycle. The audio layer 405 may send the encoded voice information 430 to the packet layer 410 by the link 420-c.

The packet layer 410 may prepare the encoded voice information 430 for transmission as voice packets 435. The packet layer 410 may receive the encoded voice information 430 during the wake period of the DRX cycle and transmit voice packets during the same wake period. In some examples, the voice encoding at the audio layer 405 may have a longer duration than a normal wake period of the DRX cycle. The packet layer 410 may extend the wake period to receive the encoded voice information 430 and transmit the voice packets 435.

Figure 5:
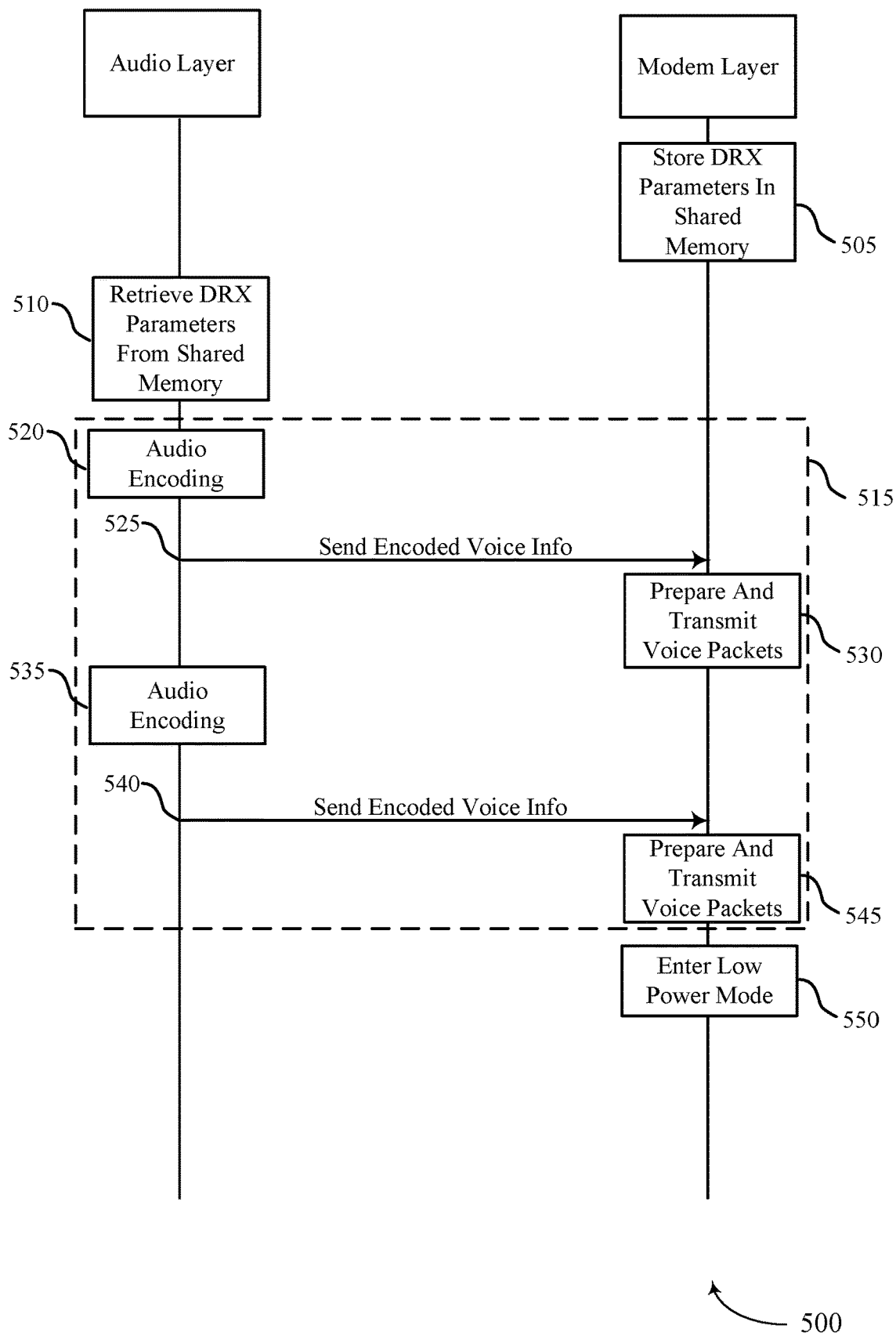
FIG. 5 illustrates an example of a voice encoding process that supports voice over internet protocol power conservation techniques for wireless systems in accordance with aspects of the present disclosure.

FIG. 5 illustrates an example of a voice encoding process 500 that supports voice over internet protocol power conservation techniques for wireless systems in accordance with various aspects of the present disclosure. In some examples, voice encoding process 500 may implement aspects of wireless communication system 100. A UE 115, as described herein and configured for VoLTE communications, may include an audio layer and a packet layer. The audio layer may encode voice information and send the encoded voice information to the packet layer. The packet layer may transmit the encoded voice information as voice packets according to the VoLTE configurations.

At 505, the packet layer may store a set of DRX parameters related to the packet layer in memory. In some examples, the memory may include storage shared between the audio layer ad the packet layer.

At 510, the audio layer may obtain the set of DRX parameters from the memory accessible by the audio layer and packet layer. The audio layer may determine a DRX wake period of the packet layer based on the set of DRX parameters. In some examples, a coding timeline for encoding voice transmission may be established based on the set of DRX parameters. For example, an encoding operation of the coding timeline may be aligned with the beginning of the DRX wake period. In another embodiment, an audio timeline of the audio layer may be synchronized with a DRX cycle of the packet layer based on the DRX parameters.

At 515, the packet layer may begin a DRX cycle and enter a wake up period. At 520 (e.g., approximately the same time as 515), the audio layer may begin an audio encoding process. For example, the audio layer may encode the set of samples of the voice transmission based on the DRX parameters. If there is an established coding timeline, the audio layer may encode the set of samples according to the established coding timeline. Similarly, if there is a synchronized audio timeline, the audio layer may encode the set of samples according to the synchronized audio timeline. At 525, the audio layer may send the encoded voice information to the packet layer.

At 530, the packet layer may prepare the encoded voice information for transmission. For example, the packet layer may transmit, to a second wireless device, a packet that corresponds to at least a portion of the encoded set of samples.

In some examples, the audio layer may perform back to back audio encodings. At 535, the audio layer may perform a second voice encoding. The audio layer may encode a first subset of samples and encode a second subset of samples subsequent to the encoding of the first subset of samples. The audio layer may then send the second subset of encoded voice information to the packet layer, and the packet layer may transmit, to the second wireless device, a packet that corresponds to at least a portion of the encoded set of samples at 545.

At 550, the packet layer may exit the wake period and enter a sleep period of the DRX cycle. The packet layer may enter a low power mode during the sleep period. In some examples, the packet layer may extend the DRX wake period based on a time interval for encoding the first and second subset of samples.

Figure 6:
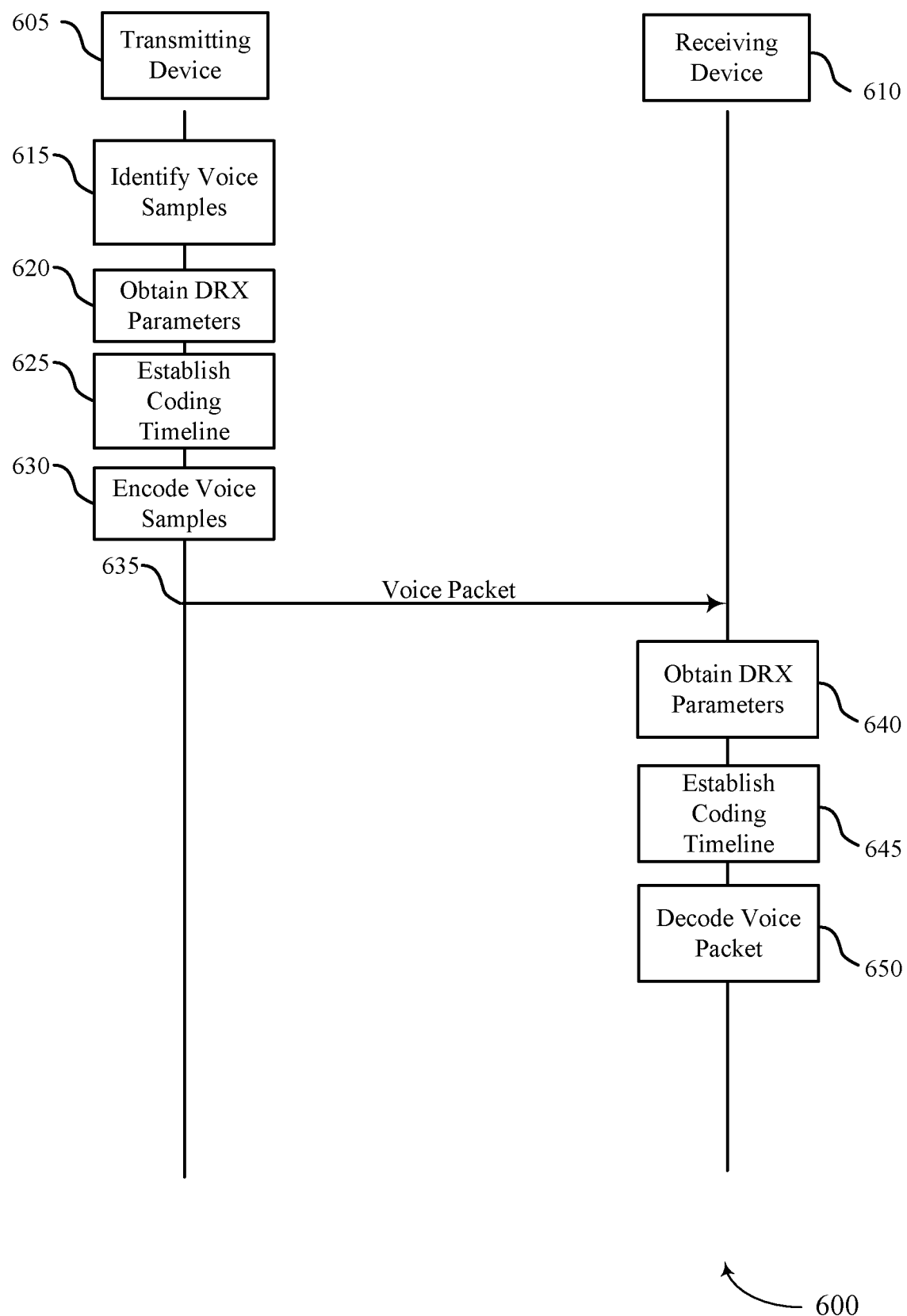
FIG. 6 illustrates an example of a process flow that supports voice over internet protocol power conservation techniques for wireless systems in accordance with aspects of the present disclosure.

FIG. 6 shows a process flow 700 that supports voice over internet protocol power conservation techniques for wireless systems in accordance with aspects of the present disclosure. In some aspects, process flow 600 may implement aspects of wireless communications systems 100 or 200. Process flow 600 illustrates aspects of techniques performed by a transmitting device 605 and a receiving device 610.

The transmitting device 605 may be an example of a UE 115 or base station 105 as described herein. The receiving device 610 may be an example of a UE 115 or base station 105 as described herein. The transmitting device 605 and receiving device 610 may communicate directly or through another device, such as a base station 105. At 615, the transmitting device 605 may identify, by an audio layer, a set of samples of a voice transmission. At 620, the transmitting device 605 may obtain DRX parameters from a memory accessible by the audio layer and a packet layer of the transmitting device 605. The transmitting device 605 may determine, by the audio layer, a DRX wake up period of the packet layer based on the set of DRX parameters.

At 625, the transmitting device 605 may establish a coding timeline for encoding the voice transmission based on the DRX parameters. The transmitting device 605 may synchronize an audio timeline of the audio layer with a DRX cycle of the packet layer based on the set of DRX parameters.

At 630, the transmitting device 605 may encode, by the audio layer, the set of samples of the voice transmission based on the synchronized audio timeline or the set of DRX parameters. In some examples, the encoding may be performed during at least a portion of the DRX wake period. In some examples, the audio layer may encode a first subset of samples and encode a second subset of samples subsequent to the encoding of the first subset of samples. In some examples, the transmitting device 605 may encode the set of samples according to an established coding timeline. The encoding operation of the coding timeline may be aligned with a beginning of a DRX wake period of the set of DRX parameters. In another example, the transmitting device 605 may encode the set of samples according to a synchronized audio timeline.

At 635, the transmitting device 605 may transmit, to the receiving device 610, a packet that corresponds to at least a portion of the encoded set of samples. The receiving device 610 may receive the packet, which may correspond to a voice over internet protocol transmission.

At 640, the receiving device 610 may obtain DRX parameters from a memory accessible by the audio layer and a packet layer of the receiving device 610. The receiving device 610 may determine, by the audio layer, a DRX wake up period of the packet layer based on the set of DRX parameters.

At 645, the receiving device 610 may synchronize an audio timeline of the audio layer with a DRX cycle of the packet layer based on the set of DRX parameters. In another embodiment, the receiving device 610 may establish a coding timeline for decoding the packet based on the set of DRX parameters.

At 650, the receiving device 610 may decode the voice packet 650. In some examples, decoding at least the portion of the packet may be performed during at least a portion of the DRX wake period. In some examples, the audio layer may decode a first portion of the packet and decode a second portion of the packet subsequent to the first portion of the packet. In some examples, the receiving device 610 may decode the portion of the packet according to an established coding timeline. The decoding operation of the coding timeline may be aligned with a beginning of a DRX wake period of the set of DRX parameters. In another example, the receiving device 610 may decode the portion of the packet according to a synchronized audio timeline.

Figure 7:
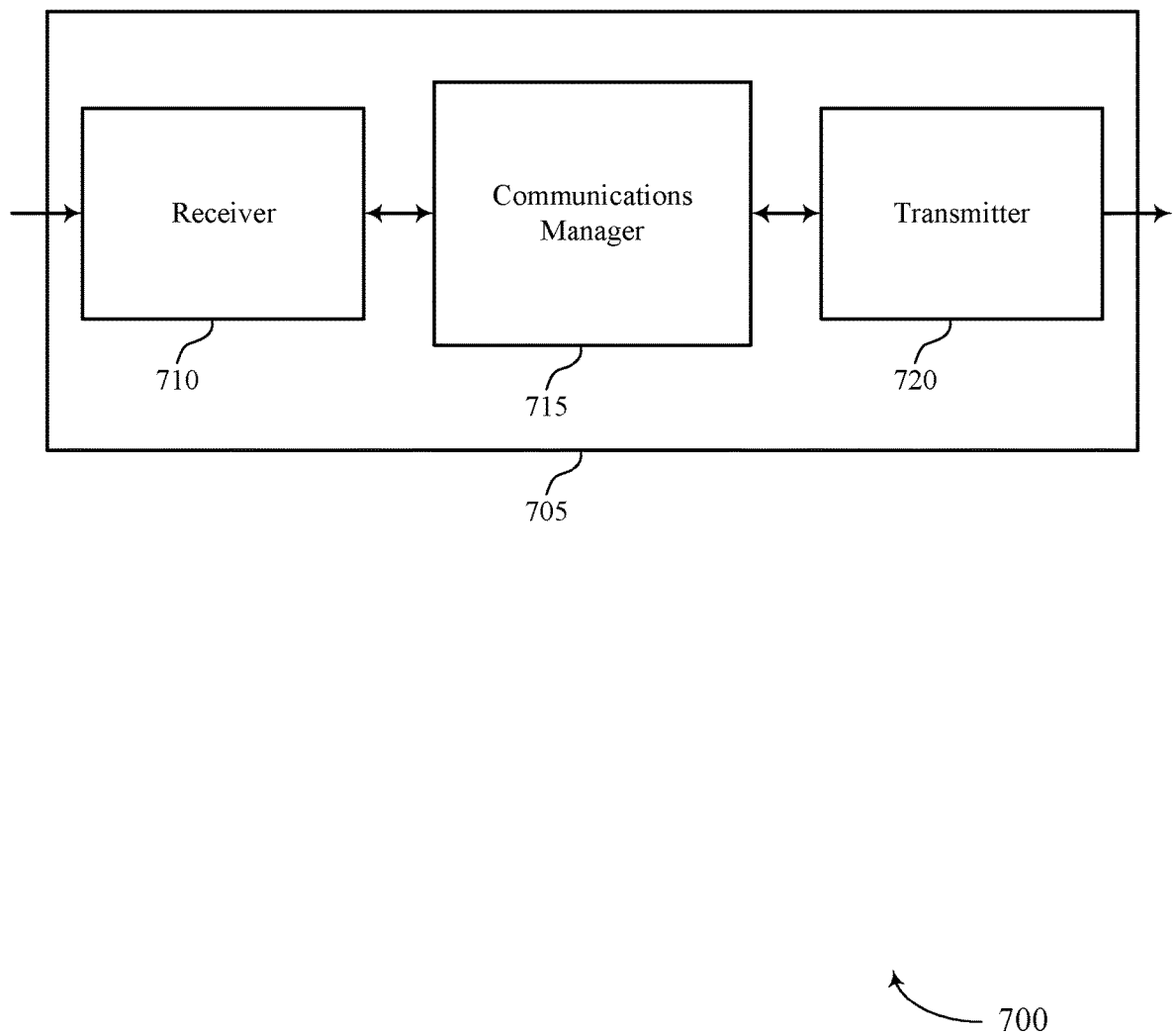
FIGS. 7 through 9 show diagrams of a device that supports voice over internet protocol power conservation techniques for wireless systems in accordance with aspects of the present disclosure.

FIG. 7 shows a diagram 700 of a wireless device 705 that supports voice over internet protocol power conservation techniques for wireless systems in accordance with aspects of the present disclosure. Wireless device 705 may be an example of aspects of a base station 105 or UE 115 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to voice over internet protocol power conservation techniques for wireless systems, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify, by an audio layer of a wireless device, a set of samples of a voice transmission, obtain, from a memory accessible by the audio layer and a packet layer of the wireless device, a set of DRX parameters corresponding to the packet layer of the wireless device, synchronize an audio timeline of the audio layer with a DRX cycle of the packet layer based on the set of DRX parameters, and encode, by the audio layer, the set of samples of the voice transmission based on the synchronized audio timeline, the set of DRX parameters, or both the synchronized audio timeline and the DRX parameters. The communications manager 715 may also receive, at a wireless device, a packet corresponding to a voice over internet protocol transmission, obtain, from a memory accessible by an audio layer and a packet layer of the wireless device, a set of DRX parameters corresponding to the packet layer of the wireless device, synchronize an audio timeline of the audio layer with a DRX cycle of the packet layer based at least in part on the set of DRX parameters, and decode, by the audio layer, at least a portion of the packet based on the synchronized audio timeline, the set of DRX parameters, or both the synchronized audio timeline and the DRX parameters.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
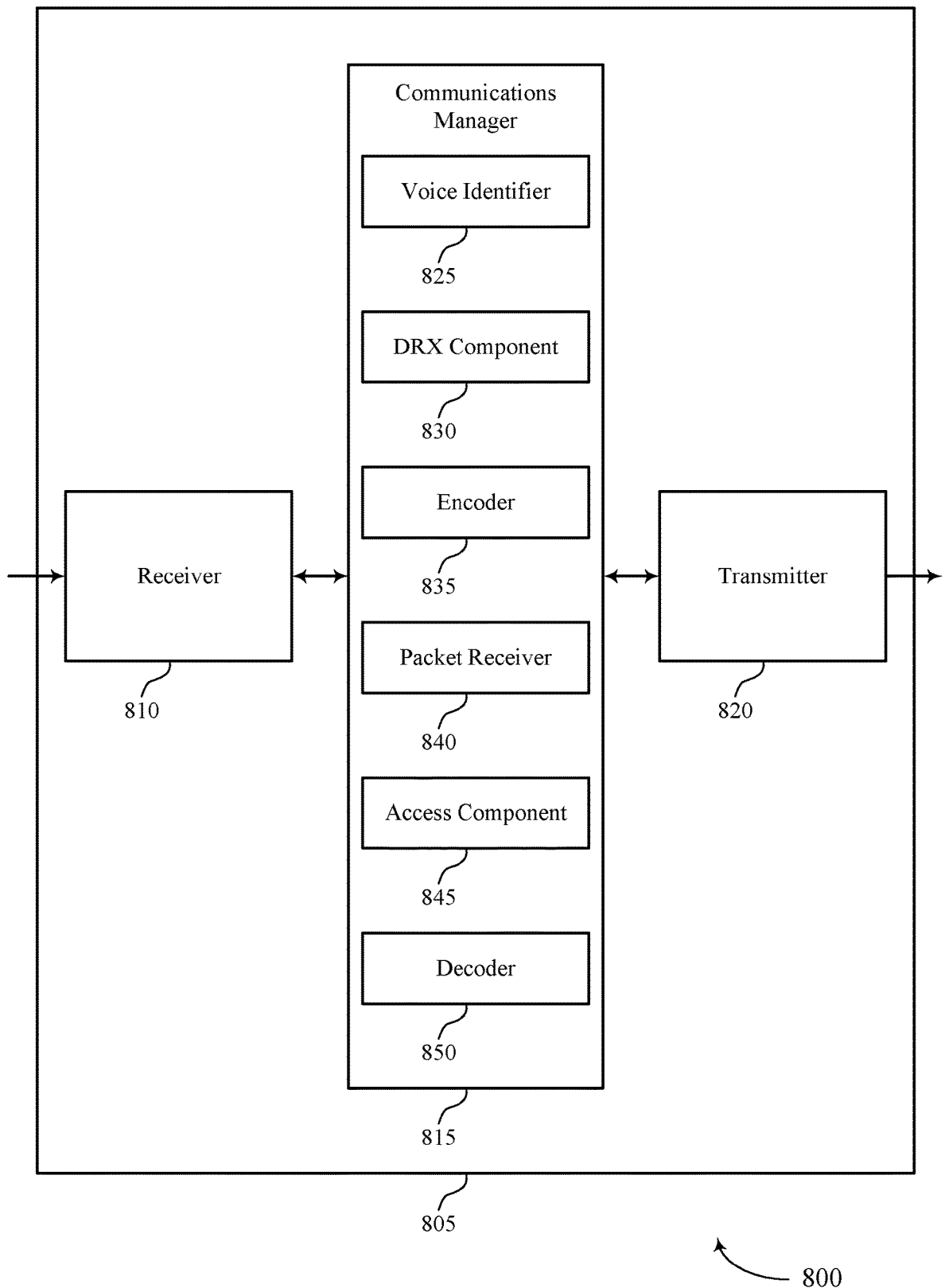

FIG. 8 shows a diagram 800 of a wireless device 805 that supports voice over internet protocol power conservation techniques for wireless systems in accordance with aspects of the present disclosure. Wireless device 805 may be an example of aspects of a wireless device 705 or a base station 105 or UE 115 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to voice over internet protocol power conservation techniques for wireless systems, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include voice identifier 825, DRX component 830, encoder 835, packet receiver 840, access component 845, and decoder 850.

Voice identifier 825 may identify, by an audio layer of a wireless device, a set of samples of a voice transmission.

DRX component 830 may obtain, from a memory accessible by the audio layer and a packet layer of the wireless device, a set of DRX parameters corresponding to the packet layer of the wireless device and determine, by the audio layer, a DRX wake period of the packet layer based on the set of DRX parameters, where encoding the set of samples is performed during at least a portion of the DRX wake period. In some examples, the DRX component 830 may synchronize an audio timeline of the audio layer with a DRX cycle of the packet layer based at least in part on the set of DRS parameters.

Encoder 835 may encode, by the audio layer, the set of samples of the voice transmission based on the set of DRX parameters or the synchronized audio timeline. Encoder 835 may send the encoded set of samples to the packet layer of the wireless device. Encoder 835 may encode the set of samples according to the established coding timeline and encode the set of samples according to the synchronized audio timeline. Encoder 835 may extend a DRX wake period of the packet layer based on a time interval for encoding of the first and second subsets of samples. In some cases, encoding the set of samples includes: encoding a first subset of samples and encoding a second subset of samples subsequent to the encoding of the first subset of samples. In some cases, the first and second subsets of samples are encoded within a DRX wake period of the packet layer. In some cases, the first and second subsets of samples are encoded back-to-back.

Packet receiver 840 may receive, at a wireless device, a packet corresponding to a voice over internet protocol transmission.

Access component 845 may obtain, from a memory accessible by an audio layer and a packet layer of the wireless device, a set of DRX parameters corresponding to the packet layer of the wireless device and determine, by the audio layer, a DRX wake period of the packet layer based on the set of DRX parameters, where decoding at least the portion of the packet is performed during at least a portion of the DRX wake period.

Decoder 850 may decode, by the audio layer, at least a portion of the packet based on the set of DRX parameters. Decoder 850 may decode at least the portion of the packet according to the established coding timeline and decode at least the portion of the packet according to the synchronized audio timeline. Decoder 850 may extend a DRX wake period of the packet layer based on a time interval for decoding the first and second portions of the packet. In some cases, a decoding operation of the coding timeline is aligned with a beginning of a DRX wake period of the set of DRX parameters. In some cases, decoding at least the portion of the packet includes: decoding a first portion of the packet and decoding a second portion of the packet subsequent to the decoding of the first portion of the packet. In some cases, the first and second portions of the packet are decoded within a DRX wake period of the packet layer. In some cases, the first and second portions of the packet are decoded back-to-back.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
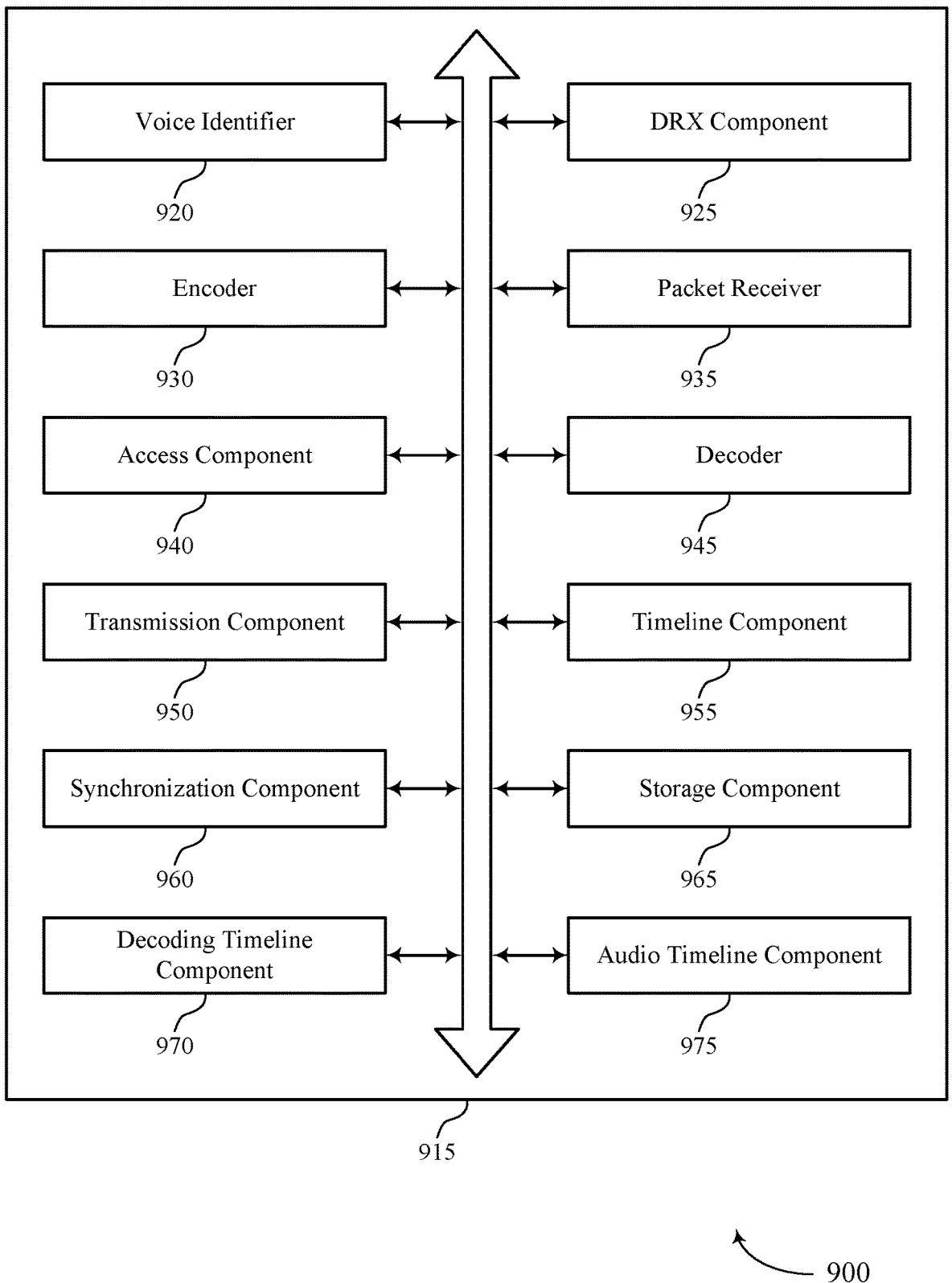

FIG. 9 shows a diagram 900 of a communications manager 915 that supports voice over internet protocol power conservation techniques for wireless systems in accordance with aspects of the present disclosure. The communications manager 915 may be an example of aspects of a communications manager 715, a communications manager 815, or a communications manager 1015 described with reference to FIGS. 7, 8, and 10. The communications manager 915 may include voice identifier 920, DRX component 925, encoder 930, packet receiver 935, access component 940, decoder 945, transmission component 950, timeline component 955, synchronization component 960, storage component 965, decoding timeline component 970, and audio timeline component 975. Each of these modules may communicate, directly or indirectly, with one another (e.g., via one or more buses).

Voice identifier 920 may identify, by an audio layer of a wireless device, a set of samples of a voice transmission.

DRX component 925 may obtain, from a memory accessible by the audio layer and a packet layer of the wireless device, a set of DRX parameters corresponding to the packet layer of the wireless device and determine, by the audio layer, a DRX wake period of the packet layer based on the set of DRX parameters, where encoding the set of samples is performed during at least a portion of the DRX wake period.

Encoder 930 may encode, by the audio layer, the set of samples of the voice transmission based on the set of DRX parameters or the synchronized audio timeline. Encoder 930 may send the encoded set of samples to the packet layer of the wireless device. Encoder 930 may encode the set of samples according to the established coding timeline and encode the set of samples according to the synchronized audio timeline. Encoder 930 may extend a DRX wake period of the packet layer based on a time interval for encoding of the first and second subsets of samples. In some cases, encoding the set of samples includes: encoding a first subset of samples and encoding a second subset of samples subsequent to the encoding of the first subset of samples. In some cases, the first and second subsets of samples are encoded within a DRX wake period of the packet layer. In some cases, the first and second subsets of samples are encoded back-to-back.

Packet receiver 935 may receive, at a wireless device, a packet corresponding to a voice over internet protocol transmission.

Access component 940 may obtain, from a memory accessible by an audio layer and a packet layer of the wireless device, a set of DRX parameters corresponding to the packet layer of the wireless device and determine, by the audio layer, a DRX wake period of the packet layer based on the set of DRX parameters, where decoding at least the portion of the packet is performed during at least a portion of the DRX wake period.

Decoder 945 may decode, by the audio layer, at least a portion of the packet based on the set of DRX parameters or the synchronized audio timeline. Decoder 945 may decode at least the portion of the packet according to the established coding timeline and decode at least the portion of the packet according to the synchronized audio timeline. Decoder 945 may extend a DRX wake period of the packet layer based on a time interval for decoding the first and second portions of the packet. In some cases, a decoding operation of the coding timeline is aligned with a beginning of a DRX wake period of the set of DRX parameters. In some cases, decoding at least the portion of the packet includes: decoding a first portion of the packet and decoding a second portion of the packet subsequent to the decoding of the first portion of the packet. In some cases, the first and second portions of the packet are decoded within a DRX wake period of the packet layer. In some cases, the first and second portions of the packet are decoded back-to-back.

Transmission component 950 may transmit, to a second wireless device, a packet that corresponds to at least a portion of the encoded set of samples.

Timeline component 955 may establish a coding timeline for encoding the voice transmission based on the set of DRX parameters. In some cases, an encoding operation of the coding timeline is aligned with a beginning of a DRX wake period of the set of DRX parameters.

Synchronization component 960 may synchronize an audio timeline of the audio layer with a DRX cycle of the packet layer based on the set of DRX parameters.

Storage component 965 may store, by the packet layer, the set of DRX parameters on the memory. In some cases, the memory includes storage shared between the audio layer and the packet layer.

Decoding timeline component 970 may establish a coding timeline for decoding the packet based on the set of DRX parameters.

Audio timeline component 975 may synchronize an audio timeline of the audio layer with a DRX cycle of the packet layer based on the set of DRX parameters.

Figure 10:
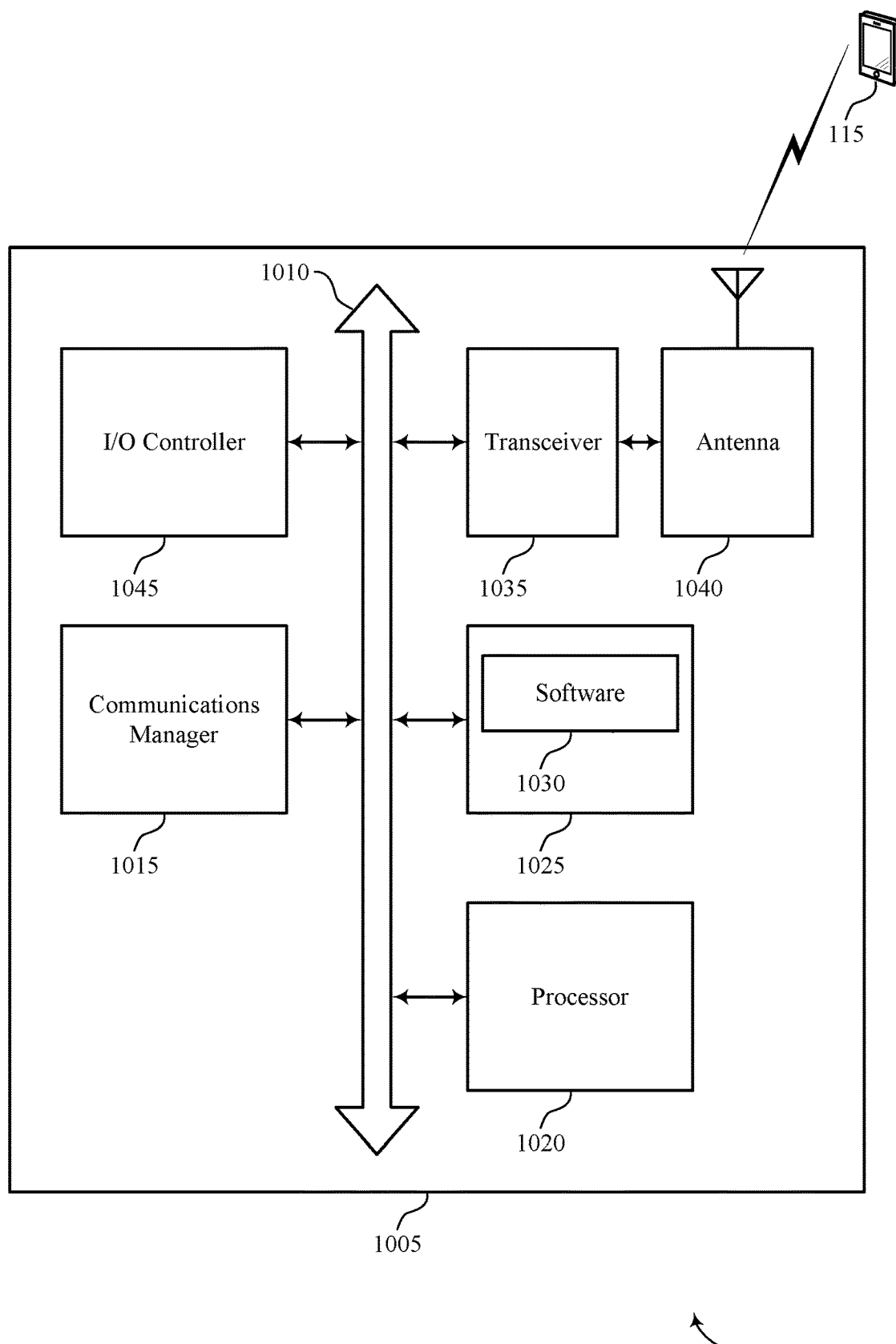
FIG. 10 illustrates a diagram of a system including a wireless device that supports voice over internet protocol power conservation techniques for wireless systems in accordance with aspects of the present disclosure.

FIG. 10 shows a diagram of a system 1000 including a device 1005 that supports voice over internet protocol power conservation techniques for wireless systems in accordance with aspects of the present disclosure. Device 1005 may be an example of or include the components of wireless device 705, wireless device 805, or a base station 105 or UE 115 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting voice over internet protocol power conservation techniques for wireless systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support voice over internet protocol power conservation techniques for wireless systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
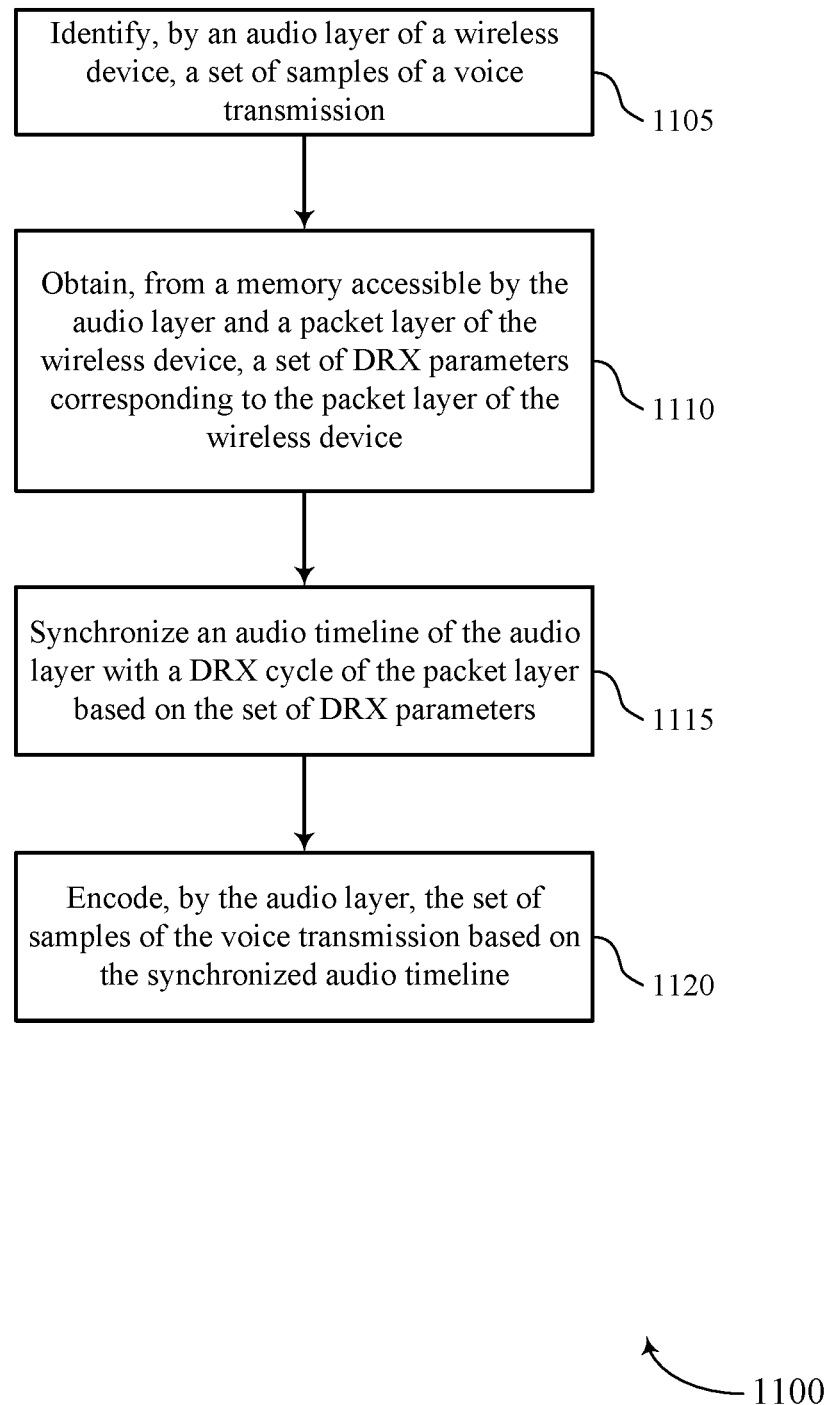
FIGS. 11 and 12 illustrate methods for voice over internet protocol power conservation techniques for wireless systems in accordance with aspects of the present disclosure.

FIG. 11 shows a flowchart illustrating a method 1100 for voice over internet protocol power conservation techniques for wireless systems in accordance with aspects of the present disclosure. The operations of method 1100 may be implemented by a base station 105 or UE 115 or its components as described herein. For example, the operations of method 1100 may be performed by a communications manager as described with reference to FIGS. 7 through 10. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At block 1105 the base station 105 or UE 115 may identify, by an audio layer of a wireless device, a set of samples of a voice transmission. The operations of block 1105 may be performed according to the methods described herein. In certain examples, aspects of the operations of block 1105 may be performed by a voice identifier as described with reference to FIGS. 7 through 10.

At block 1110 the base station 105 or UE 115 may obtain, from a memory accessible by the audio layer and a packet layer of the wireless device, a set of DRX parameters corresponding to the packet layer of the wireless device. The operations of block 1110 may be performed according to the methods described herein. In certain examples, aspects of the operations of block 1110 may be performed by a DRX component as described with reference to FIGS. 7 through 10.

At block 1115 the base station 105 or UE 115 may synchronize an audio timeline of the audio layer with a DRX cycle of the packet layer based on the set of DRX parameters. The operations of block 1115 may be performed according to the methods described herein. In certain examples, aspects of the operations of block 1115 may be performed by an encoder as described with reference to FIGS. 7 through 10.

At block 1120 the base station 105 or UE 115 may encode, by the audio layer, the set of samples of the voice transmission based at least in part on the synchronized audio timeline. The operations of block 1120 may be performed according to the methods described herein. In certain examples, aspects of the operations of block 1120 may be performed by a encoder as described with reference to FIGS. 7 through 10.

Figure 12:
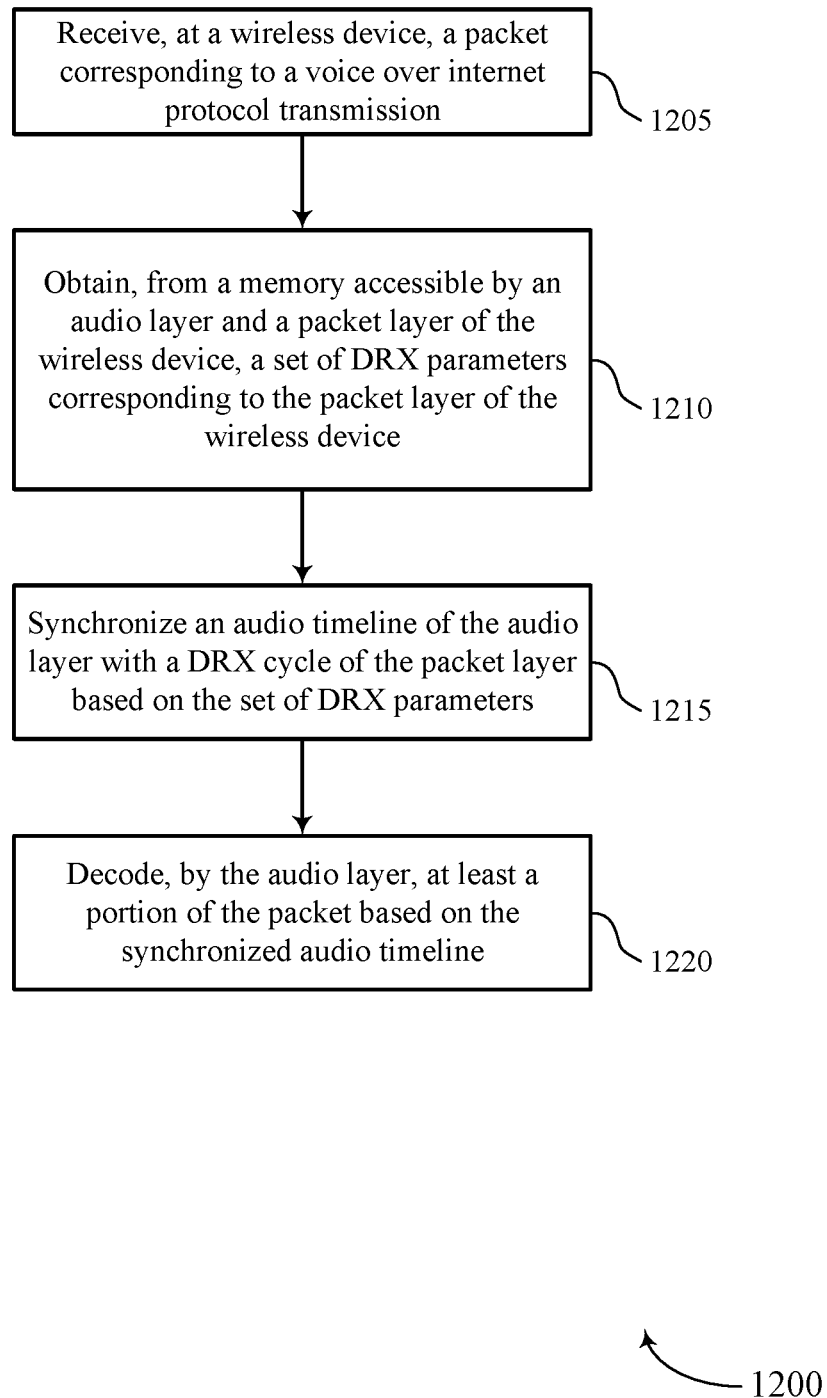

FIG. 12 shows a flowchart illustrating a method 1200 for voice over internet protocol power conservation techniques for wireless systems in accordance with aspects of the present disclosure. The operations of method 1200 may be implemented by a base station 105 or UE 115 or its components as described herein. For example, the operations of method 1200 may be performed by a communications manager as described with reference to FIGS. 7 through 10. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At block 1205 the base station 105 or UE 115 may receive, at a wireless device, a packet corresponding to a voice over internet protocol transmission. The operations of block 1205 may be performed according to the methods described herein. In certain examples, aspects of the operations of block 1205 may be performed by a packet receiver as described with reference to FIGS. 7 through 10.

At block 1210 the base station 105 or UE 115 may obtain, from a memory accessible by an audio layer and a packet layer of the wireless device, a set of DRX parameters corresponding to the packet layer of the wireless device. The operations of block 1210 may be performed according to the methods described herein. In certain examples, aspects of the operations of block 1210 may be performed by a access component as described with reference to FIGS. 7 through 10.

At block 1215 the base station 105 or UE 115 may synchronize an audio timeline of the audio layer with a DRX cycle of the packet layer based on the set of DRX parameters. The operations of block 1215 may be performed according to the methods described herein. In certain examples, aspects of the operations of block 1215 may be performed by a decoder as described with reference to FIGS. 7 through 10.

At block 1220 the base station 105 or UE 115 may decode, by the audio layer, at least a portion of the packet based at least in part on the synchronized audio timeline. The operations of block 1220 may be performed according to the methods described herein. In certain examples, aspects of the operations of block 1220 may be performed by a decoder as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, by an audio layer of a wireless device, a set of samples of a voice transmission;
   obtaining, from a memory accessible by the audio layer and a packet layer of the wireless device, a set of discontinuous reception (DRX) parameters corresponding to the packet layer of the wireless device;
   synchronizing an audio timeline of the audio layer with a DRX wake period in a DRX cycle of the packet layer based at least in part on the set of DRX parameters;
   encoding, by the audio layer, the set of samples of the voice transmission during at least a portion of the DRX wake period based at least in part on the synchronized audio timeline, wherein encoding the set of samples comprises:

encoding a first subset of samples, and
encoding a second subset of samples subsequent to the encoding of the first subset of samples; and
extending the DRX wake period of the packet layer based at least in part on a time interval for encoding of the first and second subsets of samples.

2. The method of claim 1, further comprising:
determining, by the audio layer, the DRX wake period of the packet layer based at least in part on the set of DRX parameters.

3. The method of claim 1, further comprising:
sending the encoded set of samples to the packet layer of the wireless device.

4. The method of claim 3, further comprising:
transmitting, to a second wireless device, a packet that corresponds to at least a portion of the encoded set of samples.

5. The method of claim 1, further comprising:
establishing a coding timeline for encoding the voice transmission based at least in part on the set of DRX parameters; and
encoding the set of samples according to the established coding timeline.

6. The method of claim 5, wherein:
an encoding operation of the coding timeline is aligned with a beginning of the DRX wake period of the set of DRX parameters.

7. The method of claim 1, further comprising:
encoding the set of samples according to the synchronized audio timeline.

8. The method of claim 1, wherein:
the first and second subsets of samples are encoded within the DRX wake period of the packet layer.

9. The method of claim 1, wherein:
the first and second subsets of samples are encoded back-to-back.

10. The method of claim 1, further comprising:
storing, by the packet layer, the set of DRX parameters on the memory.

11. The method of claim 1, wherein:
the memory comprises storage shared between the audio layer and the packet layer.

12. A method for wireless communication, comprising:
receiving, at a wireless device, a packet corresponding to a voice over internet protocol transmission;
obtaining, from a memory accessible by an audio layer and a packet layer of the wireless device, a set of discontinuous reception (DRX) parameters corresponding to the packet layer of the wireless device;
synchronizing an audio timeline of the audio layer with a DRX wake period in a DRX cycle of the packet layer based at least in part on the set of DRX parameters;
decoding, by the audio layer, at least a portion of the packet during at least a portion of the DRX wake period of based at least in part on the synchronized audio timeline wherein decoding at least the portion of the packet comprises:
decoding a first portion of the packet, and
decoding a second portion of the packet subsequent to the decoding of the first portion of the packet; and
extending the DRX wake period of the packet layer based at least in part on a time interval for decoding the first and second portions of the packet.

13. The method of claim 12, further comprising:
determining, by the audio layer, the DRX wake period of the packet layer based at least in part on the set of DRX parameters.

14. The method of claim 12, further comprising:
establishing a coding timeline for decoding the packet based at least in part on the set of DRX parameters; and
decoding at least the portion of the packet according to the established coding timeline.

15. The method of claim 14, wherein:
a decoding operation of the coding timeline is aligned with a beginning of the DRX wake period of the set of DRX parameters.

16. The method of claim 12, further comprising:
decoding at least the portion of the packet according to the synchronized audio timeline.

17. The method of claim 12, wherein:
the first and second portions of the packet are decoded within the DRX wake period of the packet layer.

18. The method of claim 12, wherein:
the first and second portions of the packet are decoded back-to-back.

19. The method of claim 12, further comprising:
storing, by the packet layer, the set of DRX parameters on the memory.

20. The method of claim 12, wherein:
the memory comprises storage shared between the audio layer and the packet layer.

21. An apparatus for wireless communication, comprising:
a processor;
memory in communication with the processor; and
instructions stored in the memory and operable, when executed by the processor, to cause the apparatus to:
identify, by an audio layer of the apparatus, a set of samples of a voice transmission;
obtain, from the memory accessible by the audio layer and a packet layer of the apparatus, a set of discontinuous reception (DRX) parameters corresponding to the packet layer of the apparatus;
synchronize an audio timeline of the audio layer with a DRX wake period in a DRX cycle of the packet layer based at least in part on the set of DRX parameters; and
encode, by the audio layer, the set of samples of the voice transmission during at least a portion of the DRX wake period based at least in part on the synchronized timeline, wherein the instructions are further executable by the processor to cause the apparatus to:
encode a first subset of samples;
encode a second subset of samples subsequent to encoding of the first subset of samples; and
extend the DRX wake period of the packet layer based at least in part on a time interval for encoding of the first and second subsets of samples.

22. The apparatus of claim 21, wherein the instructions are further executable by the processor to:
determine, by the audio layer, the DRX wake period of the packet layer based at least in part on the set of DRX parameters.

23. The apparatus of claim 21, wherein the instructions are further executable by the processor to:
send the encoded set of samples to the packet layer of the apparatus.

24. The apparatus of claim 23, wherein the instructions are further executable by the processor to:
transmit, to a second apparatus, a packet that corresponds to at least a portion of the encoded set of samples.

25. An apparatus for wireless communication, comprising:

a processor;
memory in communication with the processor; and
instructions stored in the memory and operable, when executed by the processor, to cause the apparatus to:
receive, at the apparatus, a packet corresponding to a voice over internet protocol transmission;
obtain, from the memory accessible by an audio layer and a packet layer of the apparatus, a set of discontinuous reception (DRX) parameters corresponding to the packet layer of the apparatus;
synchronize an audio timeline of the audio layer with a DRX wake period in a DRX cycle of the packet layer based at least in part on the set of DRX parameters; and
decode, by the audio layer, at least a portion of the packet during at least a portion of the DRX wake period based at least in part on the synchronized audio timeline, wherein the instructions are further executable by the processor to cause the apparatus to:
decode a first portion of the packet;
decode a second portion of the packet subsequent to decoding of the first portion of the packet; and
extend the DRX wake period of the packet layer based at least in part on a time interval for decoding the first and second portions of the packet.

26. The apparatus of claim 25, wherein the instructions are further executable by the processor to:
determine, by the audio layer, the DRX wake period of the packet layer based at least in part on the set of DRX parameters.

* * * * *